United States Patent [19]

Naidu et al.

[11] Patent Number: 5,146,580
[45] Date of Patent: Sep. 8, 1992

[54] METHOD AND SYSTEM FOR USING EXPANDED MEMORY FOR OPERATING SYSTEM BUFFERS AND APPLICATION BUFFERS

[75] Inventors: Harish K. Naidu, Redmond; Thomas E. Lennon; Mike R. Williamson, both of Seattle, all of Wash.; Sunil Pai, New Delhi, India

[73] Assignee: Microsoft Corporation, Remond, Wash.

[21] Appl. No.: 427,343

[22] Filed: Oct. 25, 1989

[51] Int. Cl.$^5$ .............. G06F 9/26; G06F 12/02; G06F 12/06; G06F 12/08
[52] U.S. Cl. .............. 395/425; 364/238.4; 364/245; 364/245.2; 364/245.9; 364/246.7; 364/247.7; 364/254.3; 364/255.1; 364/255.5; 364/256.3; 364/256.6; 364/256.4
[58] Field of Search ... 364/200 MS File, 900 MS File; 395/425, 400, 250, 725

[56] References Cited

U.S. PATENT DOCUMENTS

| | | | |
|---|---|---|---|
| 4,180,854 | 12/1979 | Walden et al. | 364/200 |
| 4,926,322 | 5/1990 | Stimac et al. | 364/200 |
| 4,949,248 | 8/1990 | Caro | 364/200 |

OTHER PUBLICATIONS

Microsoft Windows User's Guide, 1985–1990, Version 3.0, pp. 594–599; Microsoft Corporation.

Primary Examiner—Thomas C. Lee
Assistant Examiner—Daniel H. Pan
Attorney, Agent, or Firm—Seed and Berry

[57] ABSTRACT

A method and system for allowing both operating system buffers and application program buffers to reside in expanded memory is provided. In a preferred embodiment, a page frame in conventional memory is provided through which pages in expanded memory are accessed. An application program allocates pages in expanded memory and maps pages into the page frame. An operating system also allocates pages in expanded memory. In a preferred embodiment, an application program maps its allocated pages into each page of the page frame. The application then issues a read request to read data from a file storage device into the page frame. Upon completion of the transfer from the file storage device, the operating system determines if there are system buffers that contain a more current version of the data transferred. If so, the operating system maps a system buffer into the highest page of the page frame and then transfers the more current data from the system buffer to the application buffer. If, however, the application buffer to receive the more current data occupies the highest page in the page frame, then the system buffer is mapped into the lowest page of the page frame.

5 Claims, 6 Drawing Sheets

METHOD AND SYSTEM FOR USING EXPANDED MEMORY FOR OPERATING SYSTEM BUFFERS AND APPLICATION BUFFERS

DESCRIPTION

1. Field of the Invention

This invention relates to the field of computer systems and more specifically to a method and system for transferring data between an operating system buffer and an application buffer when both reside in expanded memory.

2. Background of the Invention

Computer systems are rapidly becoming more complex while simultaneously decreasing in size. The so-called personal computer is now a common fixture in most offices and in many homes. Many computer systems are adapted to operate the well known MS-DOS operating system available from Microsoft. Early personal computer systems were based on relatively simple microprocessors having 8-bit data paths and 16-bit address paths. Given the limited addressing range in these systems, and the then available software, the memory requirements for these systems was quite low. For example, an 8/16-bit computer system can directly address a mere 64 kilo bytes (Kb) of memory. The original MS-DOS operating system was designed in this era.

The original MS-DOS operating system was designed anticipating a maximum potential size of system memory of 640Kb. At the time, this seemed like a massive amount of memory. However, as computer hardware has advanced, and as the data handling capability of computer programs has been enhanced, the 640Kb memory limit has proven to be inadequate. Designers have developed several methods to work around this memory limit. For example, techniques such as swapping to disk or the use of overlays often increase the functionality of the system. However, these techniques often reduce system performance to unacceptable levels.

Recently, a memory architecture has been developed which dramatically increases the memory size in computer systems using the MS-DOS operating system. This memory architecture is referred to as expanded memory and it may be utilized in accordance with the Lotus/Intel/Microsoft Expanded Memory Specification (LIM-EMS or EMS). Expanded memory is memory beyond MS-DOS's 640Kb limit. Just as MS-DOS manages conventional memory, an Expanded Memory Manager (EMM) operating in accordance with the EMS manages expanded memory. The EMM can manage up to 8 megabytes of expanded memory. Expanded memory can be used for all of the same purposes as conventional memory. A complete description of the expanded memory system is set forth in the Lotus/Intel/Microsoft Expanded Memory Specification, Version 4.0, part No. 300275-004, copyright 1987, herein incorporated by reference. This document is available from Microsoft Corporation, One Microsoft Place, Redmond, Washington, 98052. An overview of the expanded memory system is also set forth in Hansen et al., "Expanded Memory: Writing Programs That Break The 640K Barrier," *Microsoft Systems Journal*, Vol. 2, No. 1, March 1987.

In the current MS-DOS environment, data and code can reside in one of three memory locations: Conventional memory, Disk Memory and Expanded Memory. Conventional memory is always available (except for the memory that is used by application programs and resident software). Moving about in conventional memory, whether through code or data, requires very little overhead. Segments register updates (when the software crosses segment boundaries) are the only substantial software overhead. Segment register updates are common to all three types of memory and are not a limitation unique to conventional memory. The main limitation to conventional memory is the 640Kb size limit. Many new application programs may approach or surpass this size limit.

Disk memory provides the advantage of providing a very large capacity. For example, most fixed or hard disks provide the capacity to store tens or hundreds of megabytes of data. However, when using disk based memory, the constant paging in and out of data and code in even the simplest applications results in a great deal of overhead. This makes disk based memory undesirable for speed sensitive applications.

Expanded memory is similar to conventional with the exception that it is not managed by the MS-DOS operating system and it requires slightly more system overhead than conventional memory. Therefore, expanded memory is the only practical option for users of MS-DOS systems requiring additional memory.

One important use of memory is the support of memory buffers. Two common types of buffers are user buffers and DOS system buffers. User buffers are typically used by application programs for the temporary storage of files, portions of files or for small blocks of data. DOS system buffers are typically used by the operating system for caching data read from disk. When a system is operating in accordance with the conventional EMS, several problems occur when using expanded memory for both user and DOS buffers.

For example, the EMS may define a 64K segment of memory that resides between 640K and 1MB for use as a page frame. This page frame is a window into expanded memory. Just after an application program starts executing, it may allocate a certain number of 16K pages of expanded memory for its own use. Four pages of expanded memory can be mapped into the expanded memory page frame at one time. By mapping pages in and out of the page frame, a program can access any area of expanded memory it has allocated.

The use of expanded memory for both user and DOS system buffers creates problems when transferring data between an operating system buffer and an application buffer when both reside in expanded memory Another problem with the EMS is with DMA. MS-DOS is not re-entrant. In other words, terminate-and-stay (TSR) programs may be invoked during the execution of a MS-DOS function. If a TSR is invoked, the system cannot determine which pages have been previously mapped in expanded memory. Thus, when DMA is invoked, the possibility exists that data read from disk will be stored in an area of expanded memory which is currently in use by an application program. This problem could be eliminated by locking pages currently in use by an application. Unfortunately, the EMS does not provide a locking function for expanded memory pages.

Furthermore, no method or system is known for eliminating problem which occurs when data is to be transferred between a user buffer and a system buffer. This is because user buffers may be mapped into each page of the page frame leaving no available room for the system buffers to be mapped in. In addition, no method or system is known for eliminating the problem which occurs while executing a TSR which requires expanded memory areas currently in use.

SUMMARY AND OBJECTS OF THE PRESENT INVENTION

In summary, the present invention contemplates a method and system for utilizing expanded memory for both DOS system and user buffers. In operation, the present invention maps DOS system buffers into a page frame having at least three pages wherein the DOS system buffers are mapped into the highest page of the page frame. The user buffers are mapped into the page frame in a sequence beginning at the lowest page of the page frame and data is read into the user buffers. The system then detects whether any of the read data overflows from the user buffers into the DOS system buffers. If so, the lowest page of the user buffers is mapped out of the page frame and the DOS system buffers are mapped into the lowest page of the page frame. User buffers are then mapped into the highest page of the page frame. Upon completion of the data transfer, the original mapping is restored.

Accordingly, it is an object of the present invention to provide a method and system for eliminating conflicts between various memory buffers.

It is another object of the present invention to provide an improved method and system for error free DMA operations in expanded memory.

It is still another object of the present invention to enhance the functionality of expanded memory.

It is yet another object of the present invention to provided a method and system for providing memory which is not managed by a computer operating system.

BRIEF DESCRIPTION OF THE DRAWINGS

These and other objects will be apparent to persons of ordinary skill in the art through the detailed description of the invention below and the accompanying drawings in which.

DETAILED DESCRIPTION OF THE INVENTION

Figure 1:
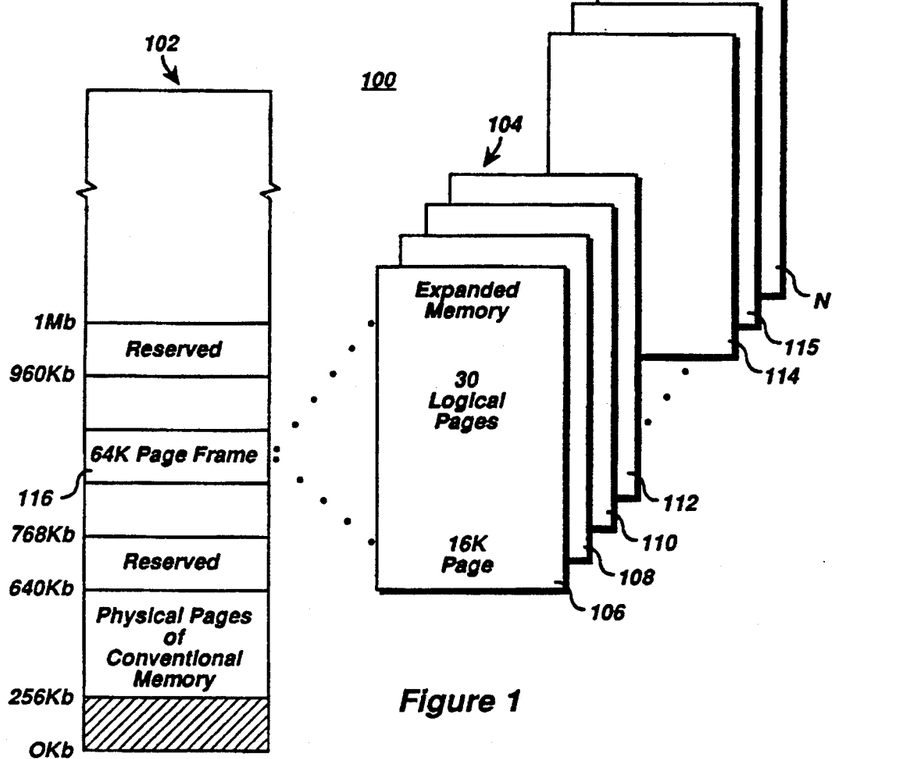
FIG. 1 is a diagram showing the architecture of an MS-DOS system provided with expanded memory.

The present invention is particularly adapted for use with the MS-DOS operating system although those skilled in the art will appreciate that the principles described herein may be adapted for use with virtually any computer operating system. Referring now to FIG. 1, the conventional memory system 100 in an MS-DOS based computer system is configured with 24–16Kb physical pages located between 256Kb and 640Kb. The memory space between 0K and 256Kb is normally used for DOS system buffers and other system uses. The memory addresses between 640Kb and 1024Kb are normally reserved for devices such as video adapters and network cards. Expanded memory is organized as a series of 16Kb logical pages 106–116 which may be mapped into a page frame. The EMS provides that the memory area between 768Kb and 960Kb may be utilized for the page frame thus providing mapping for 12 16Kb physical pages. The present invention utilizes a 64Kb page frame 116 located in the page frame which may be used for the mapping of four 16Kb physical pages. The specific location of the 64Kb page frame may be user configured so as not to conflict with other devices normally having addresses in this location.

The present invention provides a method and system for implementing DOS system buffers in expanded memory, thus freeing conventional memory for other uses.

Figure 2:
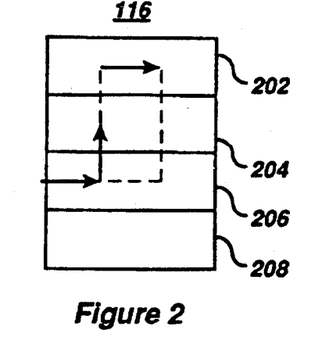
FIG. 2 is a memory map showing one instance of user buffers and DOS system buffers in expanded memory.
Figure 3:
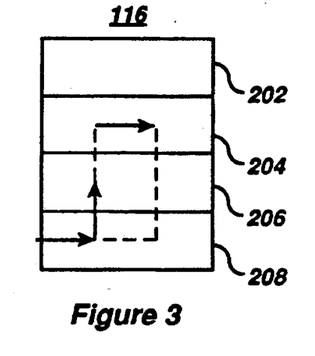
FIG. 3 is a memory map showing another instance of user buffers and DOS system buffers in expanded memory.

Referring now to FIG. 2, in accordance with the principles of the present invention, four logical pages may be mapped in the 64Kb page frame 116 at any one time, wherein these pages may be used to map either user buffers or DOS system buffers. User buffers are typically used by application programs for storing data read from disk, etc. DOS system buffers may be used for caching data, for storing file allocation tables and for other system operations. DOS system buffers are used during DOS system calls. User buffers are most often used during the operation of application programs. User buffers and DOS system buffers often contain different versions of the same files. Assuming that user buffers are mapped into pages 202, 204, and 206 of page frame 116, DOS system buffers may be mapped into page 208 and no conflict exists. Similarly, as shown in FIG. 3, if user buffers are mapped into pages 204, 206 and 208 of page frame 116, DOS system buffers may be mapped into page 202 and no conflict exists.

Figure 4A:
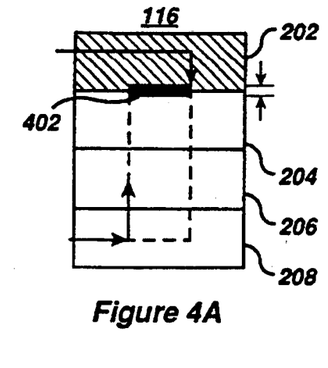
FIGS. 4A–4C are a series of memory maps detailing the operation of the present invention when an overlap between DOS system buffers and user buffers are detected.
Figure 4B:
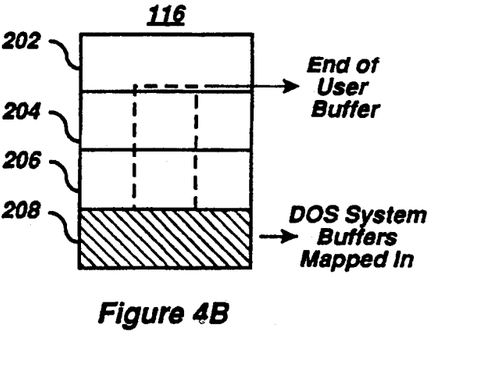
Figure 4C:
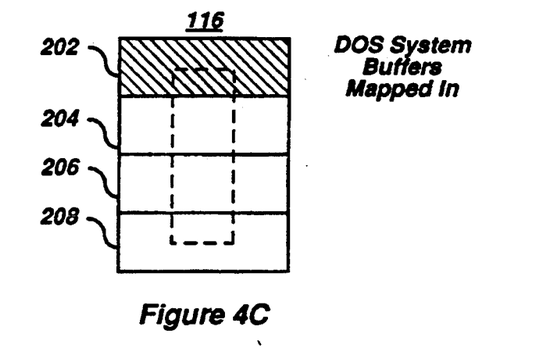

FIGS. 4A–4C are a series of diagrams which demonstrate the operation of the present invention when mapping for user buffers conflicts with mapping for operating system buffers. In accordance with the principles of the present invention, DOS system buffers are preferably mapped into the highest page 202 of the page frame 116. As shown in FIG. 4A, as data is read into user buffers, the process begins by filling the user buffer mapped into the lowest page 208, followed by the user buffer mapped into page 206, etc. If the user buffers span only three pages, no conflict exists. If however, the user buffers span more than three pages, the mapping for the user buffers and the DOS system buffers will conflict. There is no provision in the EMS for eliminating this conflict.

MS-DOS reads data from disk in blocks of 512 bytes. The system of the present invention is employed whenever a 512 byte segment from the user buffer overlaps into the DOS system buffer page as indicated by overlap area 402. This situation occurs most commonly in the case of a DOS read operation. Whenever a DOS read operation occurs, the DOS must determine whether any of the newly read sectors have a more recent version already stored in memory. This could occur when data cached in a DOS system buffer has not yet been written to disk. In this case, it is necessary to map both DOS system buffers and user buffers into the page frame 116. As mentioned above, DOS system buffers are preferably mapped into the highest page 116 of page frame 202. As shown in FIG. 4B, data is read into page 208, followed by 206, 204, etc. As soon as an overlap is detected, the user buffers in page 208 are mapped out and the DOS system buffers are mapped into page 208, thus freeing frame 202 for user buffers. Once the data transfer is complete, the original mapping is restored as shown in FIG. 4C.

Figure 5:
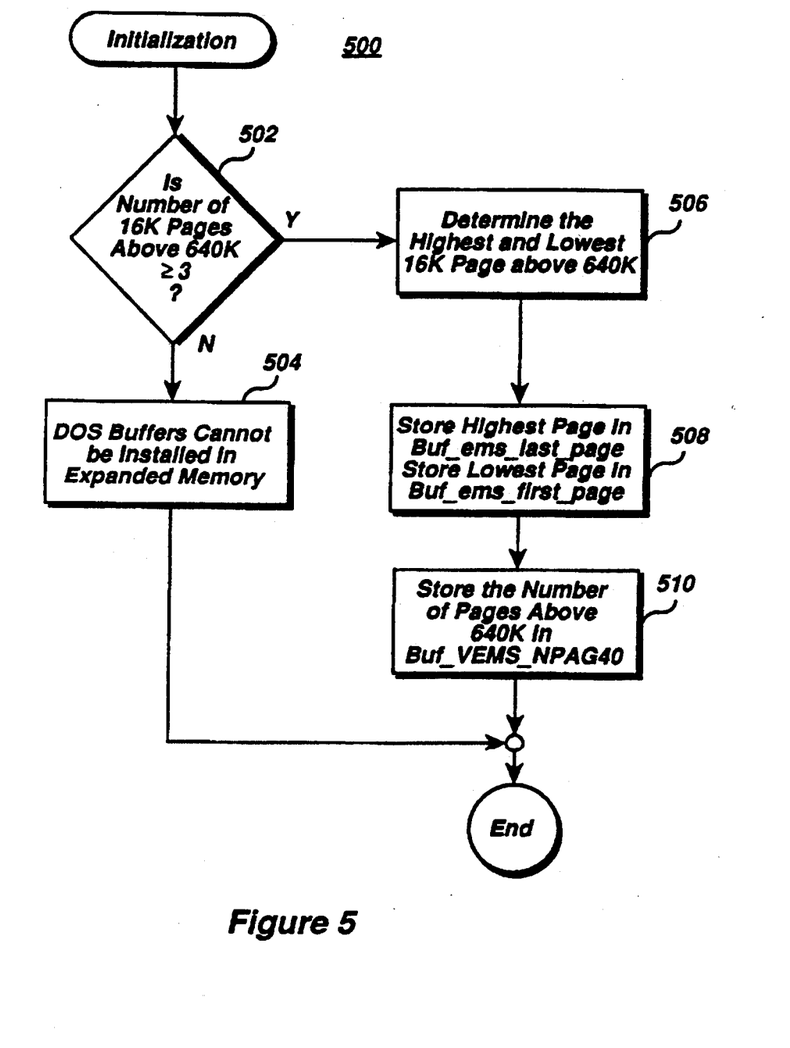
FIG. 5 is a flow diagram detailing the operation of the present invention during system initialization.

Referring now to FIG. 5, the initialization routine 500 is invoked when the computer system is activated. Upon power-up, decision 502 determines whether expanded memory is present and whether at least three pages are available for use as the page frame. If not, item 504 indicates that DOS system buffers cannot be installed in expanded memory, and the routine 500 returns. If at least three pages are available for use as the page frame, control passes to item 506 which determines the addresses of the highest and lowest pages in the page frame. Item 508 then stores this address information as the variables Buf_ems_last_page and Buf_ems_first_page. Item 510 then stores the number of pages above 640K as the variable Buf_VEMS_NPAG40.

Figure 6:
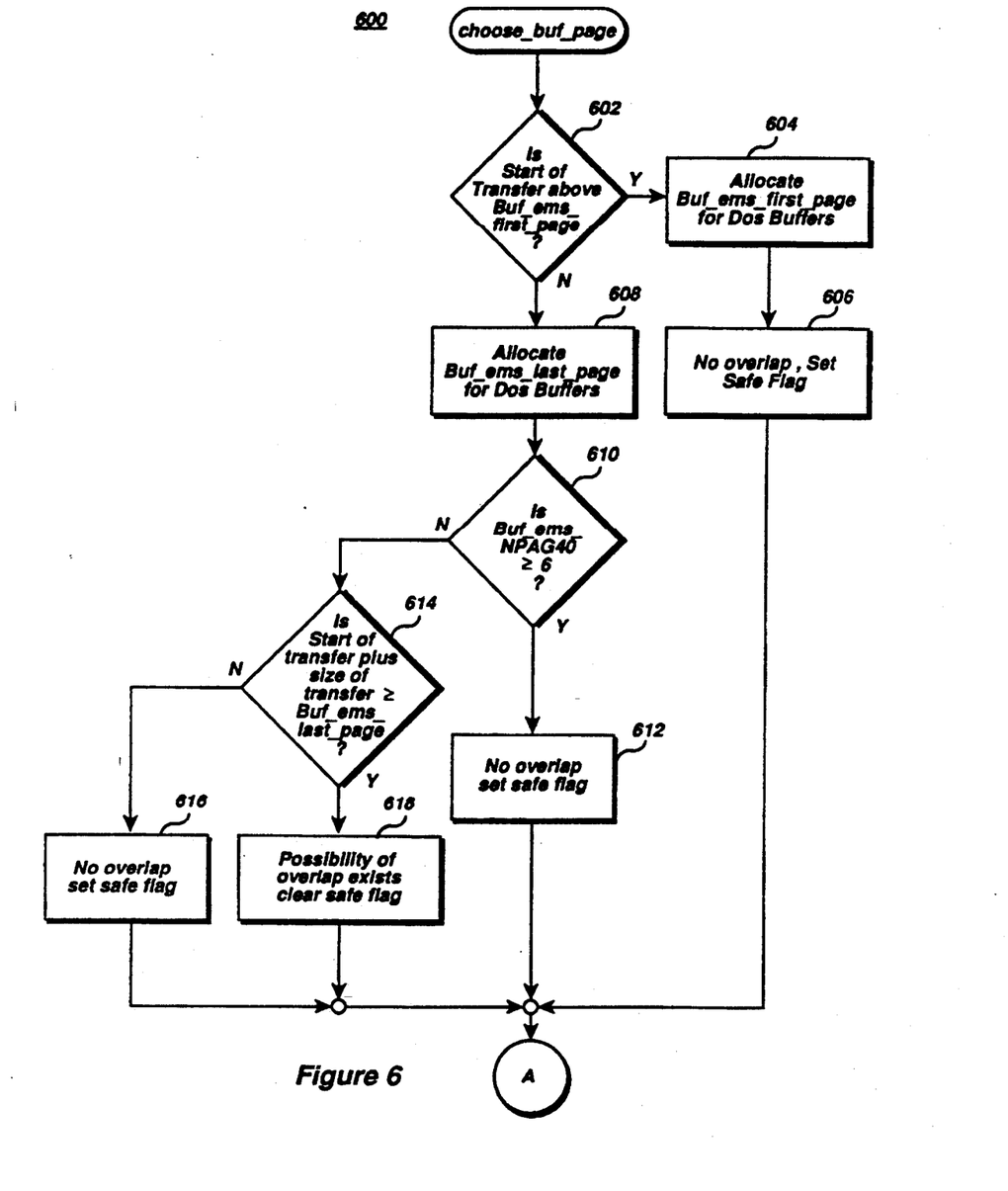
FIG. 6 is a flow diagram detailing the operation of the present invention while allocating pages in the expanded memory page frame.

Referring now to FIG. 6, the routine 600 is invoked during a DOS Read operation to determine which of the EMS pages chosen during initialization are to be used for mapping DOS system buffers. As inputs, the routine 600 uses the contents of the DMAADD register which has the address into which data is to be transferred, and the variable CX which indicates the size of the transfer. Decision 602 determines whether the start of the data transfer is above the address pointed to by Buf_ems_first_page. If so, item 604 allocates the first page in the page frame 116 for use as DOS system buffers. Item 606 then sets the safe flag. The safe flag is used to indicate that no overlap is possible between DOS system buffers and the user buffer area. If the safe flag is set, the present invention does not check for overlaps. Control then passes to decision 802 after data is read in. If the start of the transfer, is not above the first page in the page frame, item 608 allocates the highest page in the page frame 116 for use as DOS system buffers. Decision 610 then determines whether the variable Buf_ems_NPAG40 is greater than or equal to 6. If so, no overlap is possible and item 612 sets the safe flag. Otherwise, decision 614 determines whether the address of the start of the transfer plus the size of the transfer is greater than the variable Buf_ems_last_page. If so, an overlap is possible and item 618 clears the safe flag. If not, no overlap exists and item 616 sets the safe flag. Once items 616 or 618 are executed, the control passes to decision 802 after data is read in.

Figure 7:
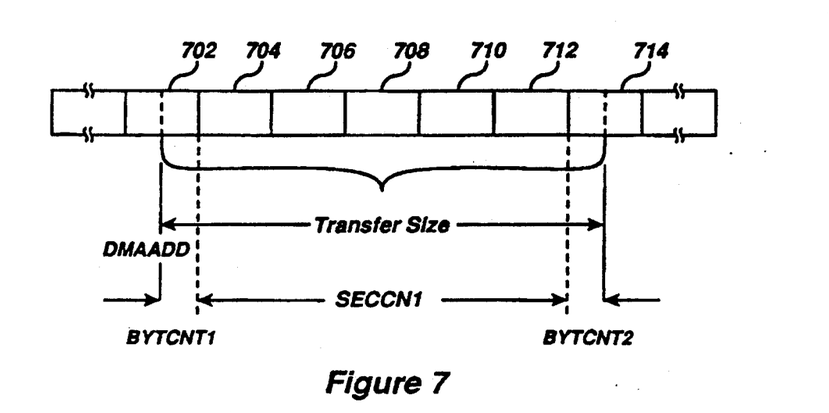
FIG. 7 is a diagram illustrating a MS-DOS disk read operation.

Referring now to FIG. 7, once the initialization process 600 is complete, the present invention reads the data of interest. Data is stored on disk in a series of sectors, such as sectors 702-714. MS-DOS splits data transfers from disk into three parts: the number of bytes to read in the first sector (BYTECNT1), the number of whole sectors to transfer (SECCNT) and the number of bytes to read in the last sector (BYTECNT2). The location of the first byte to be read is pointed to by the variable DMAADD. As shown in the example of FIG. 7, only a portion of sectors 702 and 714 are read. The present invention first determines the DOS system buffers corresponding to the sectors of interest. Next, it is determined whether the page corresponding to the DOS system buffer of interest is currently mapped in. If not, the DOS system buffer is mapped in. The routine which maps the page determines whether the current user buffer overlaps with the page used for mapping the DOS system buffers. If so, the DOS system buffers are remapped in accordance with the principles set forth herein. The data of interest is then read from the DOS system buffer into the appropriate user buffer.

In the case of whole sector reads, the data of interest is read from disk into the mapped user buffer. Once the data is read in, the system of the present invention checks each sector to determine whether a more recent copy exists in one of the DOS system buffers. If so, the more recent copy is copied over the corresponding sector just read in. This process is explained in further detail in conjunction with FIG. 8.

Figure 8:
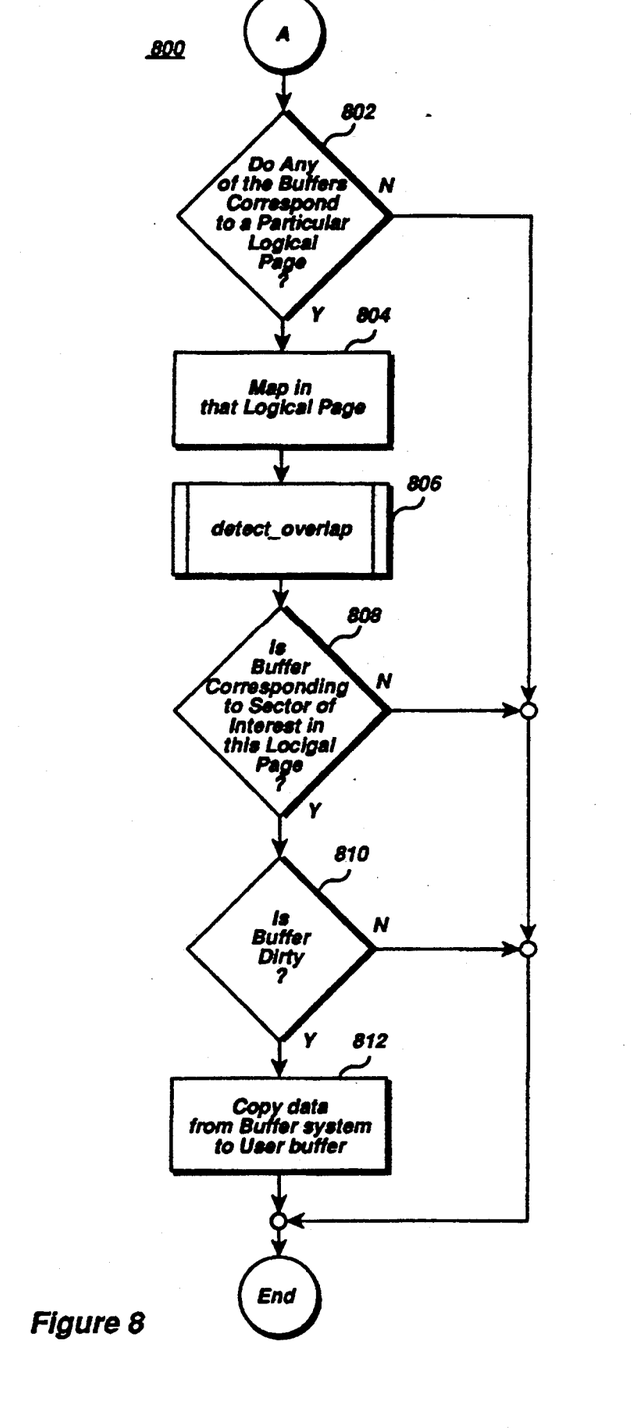
FIG. 8 is a flow diagram illustrating the operation of the present invention while reading data from disk into the expanded memory pages mapped into the allocated pages.

The routine 800 is invoked once data has been read from disk to a user buffer in expanded memory. When invoked, decision 802 determines whether any of the user buffers of interest correspond to a particular logical page in expanded memory having a more recent version of the sectors just read. If not, the routine returns. Otherwise, item 804 maps in the logical page corresponding to the sectors of interest. Process 806 is then called to detect an overlap between user and DOS system buffers. Process 806 is discussed in further detail in conjunction with FIG. 9. When process 806 returns, control passes to decision 808 which determines whether the DOS system buffer currently mapped in contains the sector of interest. If not, the routine returns. Otherwise, decision 810 determines whether the the DOS system buffer is dirty, i.e., the buffer contains newly updated data. If not, the routine returns. If the DOS system buffer is dirty, item 812 copies the data from the DOS system buffer into the user buffer. The routine then returns.

Figure 9:
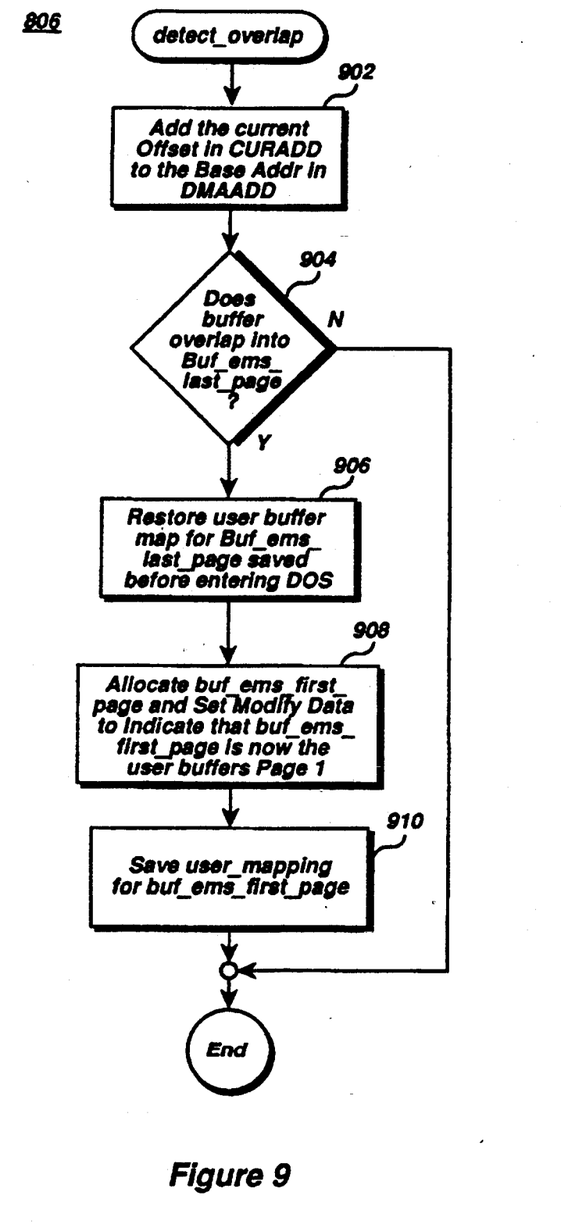
FIG. 9 is a flow diagram of the detect collision routine of the present invention.

Referring now to FIG. 9, the detect_overlap routine 806 is shown. The procedure 806 receives as input the current address of the buffer of interest (CURADD) and the value of the variable DMAADD. Item 902 adds the value of CURADD to the base address in DMAADD. Decision 904 then uses the value returned by item 902 to determine whether the user buffer overlaps into the EMS page pointed to by Buf_ems_last_page. If not, the routine returns. Otherwise, item 906 restores the mapping for the user buffer prior to mapping the DOS system buffer. Item 908 then allocates the page pointed to by buf_ems_first_page for use as user a system buffer and maps in a system buffer. Item 910 then saves the mapping for the user buffer pointed to by buf_ems_first_page.

In summary, an improved method and system for implementing DOS system and user buffers in expanded memory has been described. According to the principles of the present invention a method and system for implementing DOS system buffers and user buffers in expanded memory without conflict have been provided. Accordingly, other uses and applications of the teachings set forth herein will be apparent to persons of ordinary skill without departing from the spirit and scope of the present invention.

We claim:

1. A computer implemented method of transferring data between a user buffer and system buffer in a computer system having a plurality of user buffers and system buffers, the computer system having expanded memory comprising logical pages and conventional memory comprising physical pages, the computer system having an address space, the conventional memory being within the address space of the computer system, the user buffers and system buffers being stored in expanded memory, the method comprising the steps of:
  (a) allocating a page frame in conventional memory for mapping of logical pages into the address space;
  (b) logically dividing the page frame into at least three pages, including a highest page and a lowest page;
  (c) mapping user buffers into the page frame;
  (d) for each page in the mapped user buffers, determining whether any of the pages need to have data transferred between a target system buffer;
  (e) if a transfer is needed with a determined page that is not the highest page of the page frame, mapping the target system buffer into the highest page of the page frame, transferring data between the determined page and the mapped target system buffer, and re-mapping the user buffer that was previously in the highest page back into the highest page of the page frame upon completion of the transfer; and
  (f) if a transfer is needed with a determined page that is the highest page of the page frame, mapping the target system buffer into the lowest page of the page frame, transferring data between the determined page and the mapped target system buffer, and re-mapping the user buffer that was previously in the lowest page back into the lowest page of the page frame upon completion of the transfer.

2. A computer implemented method of transferring data from a computer storage device to a user buffer in a computer system, the computer system having expanded memory comprising logical pages and conventional memory comprising physical pages, the computer system having an address space, the conventional memory being within the address space of the computer system, the computer system having system buffers, the system buffers containing data more current than data on the storage device, the method comprising the steps of
  (a) specifying a page frame in conventional memory for mapping of logical pages into the address space;
  (b) logically dividing the page frame into at least three pages, including a highest page and a lowest page;
  (c) mapping user buffers into the page frame;
  (d) transferring data from the computer storage device into the user buffers mapped into the page frame; and
  (e) for each page in the page frame containing a user buffer,
    (i) determining whether a system buffer contains data more current;
    (ii) if a system buffer contains data more current than the page in the page frame and the page is not the highest page, mapping the system buffer with more current data into the highest page, transferring data from the mapped system buffer to the page, and re-mapping the user buffer that was previously int eh highest page back into the highest page upon completion of the transfer; and
    (iii) if a system buffer contains data more current than the page in the page frame and the page is the highest page, mapping the system buffer with more current data into the lowest page, transferring data from the mapped system buffer to the page, and re-mapping the user buffer that was previously in the lowest page back into the lowest page upon completion of the transfer.

3. A computer implemented method in an operating system in a computer system for sharing a page frame with an application program, the computer system having expanded memory comprising logical pages and conventional memory comprising physical pages, the computer system having an address space, the conventional memory being within the address space of the computer system, the page frame being logically within the address space, the operation system having system buffers in the expanded memory, the application program having application buffers in the expanded memory, wherein the application buffers are mapped into the page frame, the method comprising the steps of:
  (a) receiving a request from the application program for transferring data from a storage device into the application buffers mapped into the page frame;
  (b) transferring data from the storage device to application buffers mapped into the page frame;
  (c) selecting a mapped application buffer wherein a system buffer has more current data than the data transferred to the selected mapped application buffer;
  (d) selecting a page of the page frame other than the page corresponding to the selected mapped application buffer;
  (e) mapping the system buffer with more current data into the selected page of the page frame;
  (f) transferring data from the mapped system buffer to the selected mapped application buffer to replace data with the more current data; and
  (g) re-mapping into the page frame the application buffer that was previously in the selected page upon completion of the transfer.

4. The computer implemented method of claim 3 wherein the page frame has a highest and a lowest page and wherein the step of mapping a system buffer into the page frame maps the system buffer into the highest page when the application buffer that is to receive the more current data is not in the highest page, the maps the system buffer into the lowest page when the application buffer that is to receive the more current data is in the highest page.

5. A computer implemented method of transferring data from a computer file storage device to an application buffer in a computer system, wherein a sector of data is transferred as a unit of transfer, wherein a system buffer has a more current version of the data that resides on the device, the computer system having expanded memory comprising logical pages and conventional memory comprising physical pages, the computer system having an address space, the conventional memory being within the address space of the computer system, the application buffer and system buffer being stored in expanded memory, the method comprising the steps of:
  (a) mapping the application buffer into the page frame;
  (b) transferring data from the file storage device to the application buffer; and (c) for each sector of data transferred,
  (i) determining whether the system buffer contains a more current version of data for the sector transferred;
  (ii) if the system buffer contains a more current version of the data for the sector and the sector was not transferred into the highest page, mapping a logical page in the system buffer with the more current version of the data for the sector transferred into the highest page, transferring the more current data from the highest page to overwrite data in the application buffer, and re-mapping an application buffer into the highest page upon completion of the transfer; and
  (iii) if the system buffer contains a more current version of the data for the sector and the sector was transferred into the highest page, mapping a logical page in the system buffer with the more current version of the data for the sector transferred into the lowest page, transferring the more current version of the data from the lowest page to overwrite data in the application buffer, and re-mapping an application buffer into the lowest page upon completion of the transfer.

* * * * *

UNITED STATES PATENT AND TRADEMARK OFFICE
CERTIFICATE OF CORRECTION

PATENT NO. : 5,146,580
DATED : September 8, 1992
INVENTOR(S) : Harish K. Naidu et al.

It is certified that error appears in the above-identified patent and that said Letters Patent is hereby corrected as shown below:

In column 7, claim 2, line 68, please delete "int he" and substitute therefor -- in the --.

In column 8, claim 3, line 19, please delete "operation" and substitute therefor -- operating --.

In column 8, claim 4, line 49, after "page," please delete "the" and substitute therefor -- and --.

Signed and Sealed this

Fourteenth Day of September, 1993

Attest:

BRUCE LEHMAN

Attesting Officer

Commissioner of Patents and Trademarks